Figure 1:
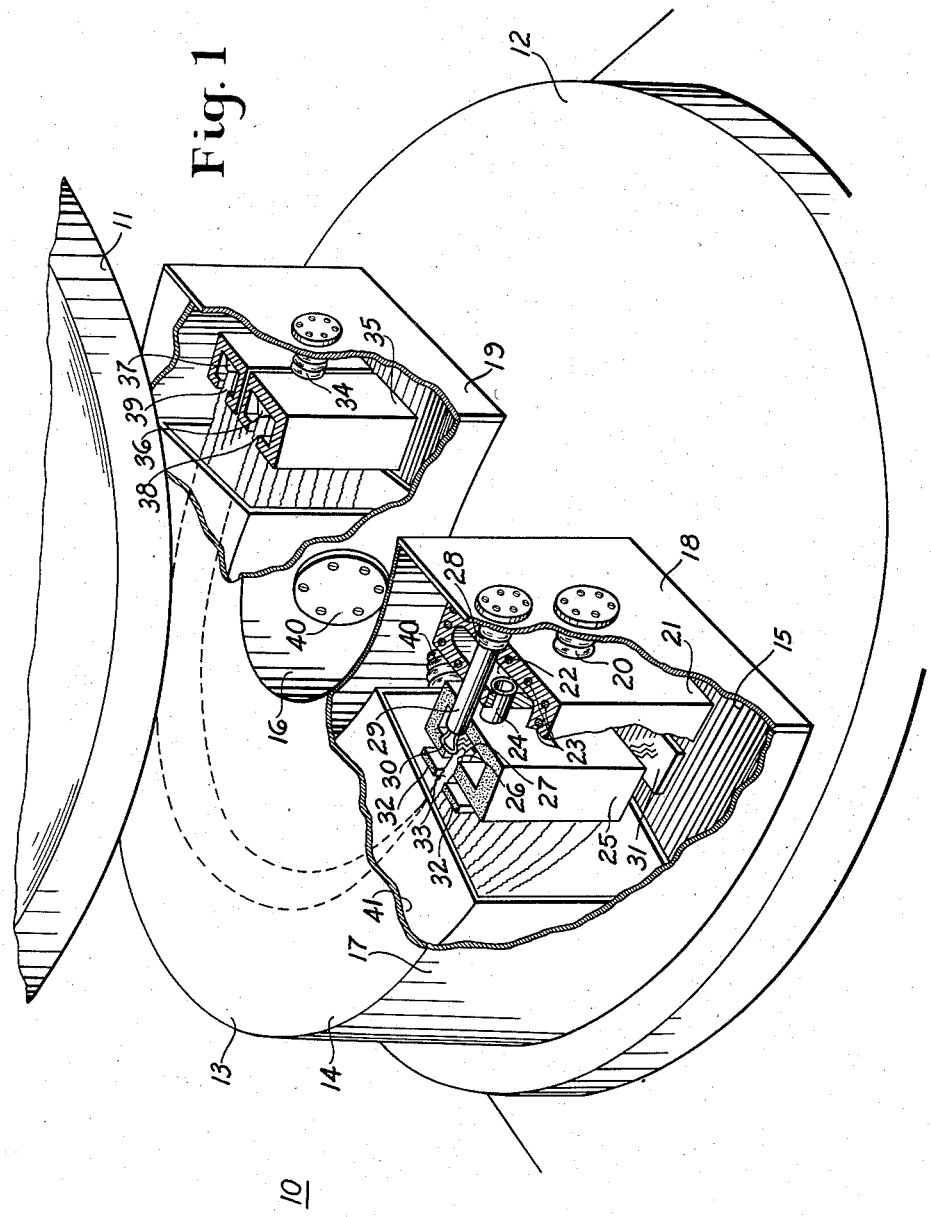

Jan. 20, 1959  S. ROSENFELD  2,869,981
PROCESS FOR THE PURIFICATION OF URANIUM
Filed Dec. 8, 1944  4 Sheets-Sheet 1

INVENTOR.
SAM ROSENFELD
BY
ATTORNEY

United States Patent Office 2,869,981
Patented Jan. 20, 1959

2,869,981

PROCESS FOR THE PURIFICATION OF URANIUM

Sam Rosenfeld, Los Angeles, Calif., assignor to the United States of America as represented by the United States Atomic Energy Commission Application December 8, 1944, Serial No. 567,286

10 Claims. (Cl. 23—14.5)

This invention relates to the purification of uranium and more particularly to improved reclamation processes that are especially adapted for use in conjunction with the salvaging of uranium from wash solutions derived from calutrons employed in the calutron method of producing uranium enriched with $U^{235}$.

In the copending application of Ernest O. Lawrence, Serial No. 557,784, filed October 9, 1944, now Patent No. 2,709,222, there is disclosed a "calutron," a machine designed to separate the constituent isotopes of an element containing several isotopes, in order to produce the element enriched with the selected isotope. More specifically, the calutron mentioned is especially designed to produce uranium enriched with the isotope $U^{235}$.

In the copending application of James M. Carter and Martin D. Kamen, Serial No. 532,159, filed April 21, 1944, now Patent No. 2,758,000, there is disclosed an improved process of producing uranium enriched with $U^{235}$ employing the calutron method and comprising first-stage and second-stage calutrons. In accordance with this process, uranium of natural or normal isotopic composition is treated in a first-stage in order to produce as a product uranium singly enriched with $U^{235}$, which uranium singly enriched with $U^{235}$ is treated in a second-stage calutron in order to produce as a product uranium doubly enriched with $U^{235}$, which uranium doubly enriched with $U^{235}$ may be used commercially. In the operation of either a first-stage calutron or a second-stage calutron the compound $UCl_4$ is treated, whereby a residue of the $UCl_4$ is deposited on the parts of the calutron disposed in the source region thereof, metallic uranium enriched with $U^{235}$ is deposited in the first pocket of the calutron, and metallic uranium impoverished with respect to $U^{235}$ is deposited in the second pocket of the calutron. The deposit of $UCl_4$ is recovered by a water wash step and the deposits of metallic uranium are separately recovered by acid wash steps; and the three wash solutions are separately purified, if required, to produce three separate batches of a given compound of uranium. In this process, a first batch of the uranium compound mentioned, produced from the water wash derived from a first-stage calutron, is then converted back to $UCl_4$ for re-treatment in the first-stage calutron, and a second batch of the uranium compound mentioned, produced from the water wash derived from a second-stage calutron, is then converted back to $UCl_4$ for re-treatment in the second-stage calutron.

Accordingly, it is an object of the invention to provide an improved process of reclaiming uranium from solutions thereof.

Another object of the invention is to provide an improved process of salvaging the uranium from a solution of the character mentioned that may be readily carried out on a commercial scale and in an economical manner.

Another object of the invention is to provide an improved process of recovering the residue of a uranium compound which has been subjected to treatment in a calutron from the parts of a calutron disposed in the source region thereof upon which the residue is deposited.

A further object of the invention is to provide an improved process of recovering metallic uranium enriched with $U^{235}$ from the collector of a calutron upon which the enriched metallic uranium is deposited.

A still further object of the invention is to provide an improved process of purifying uranium which has been recovered from a calutron.

Still another object of the invention is to provide a process of reclaiming uranium from a wash solution derived from a calutron in which the uranium is separated from metal impurities as a chloride.

A still further object of the invention is to provide a process of purifying uranium contained in a wash solution derived from a calutron in which uranium is precipitated by ammonia away from certain metal impurities in the wash solution and separated from other metallic impurities in said precipitate by chlorination and selective volatilization of said impurities.

A still further object of the invention is to provide an improved process of reclaiming uranium from a wash solution derived from a calutron and converting the uranium so reclaimed into a suitable compound for re-charging a calutron.

A still further object is to provide an improved process for treating uranium compounds in a calutron in which the residual uranium compound and impurities such as iron, copper, nickel, and chromium contained in a wash solution derived from the calutron are separated from said uranium compound and the resulting compound is converted into a suitable charge for further calutron treatment.

Figure 2:
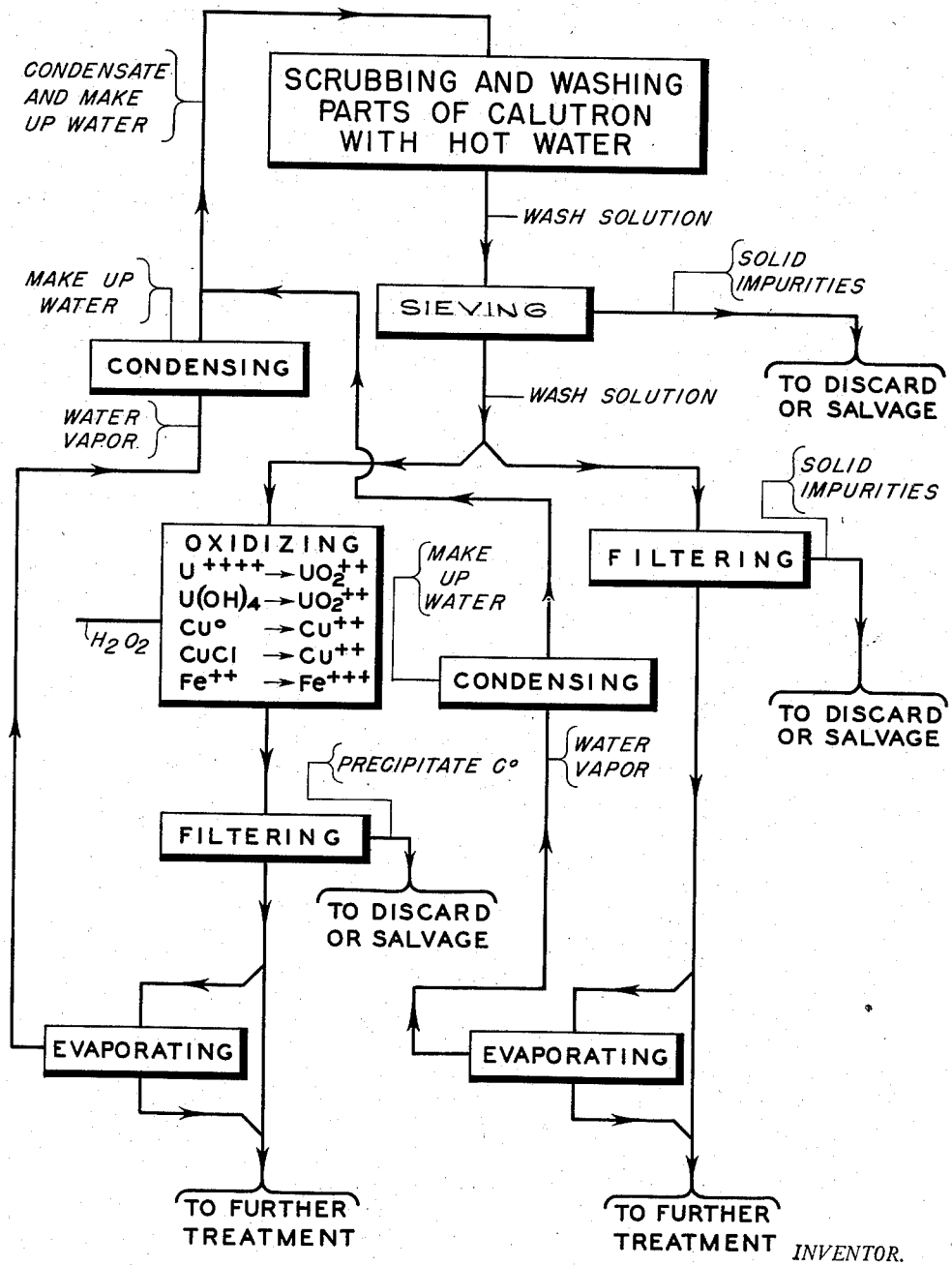
Figure 3:
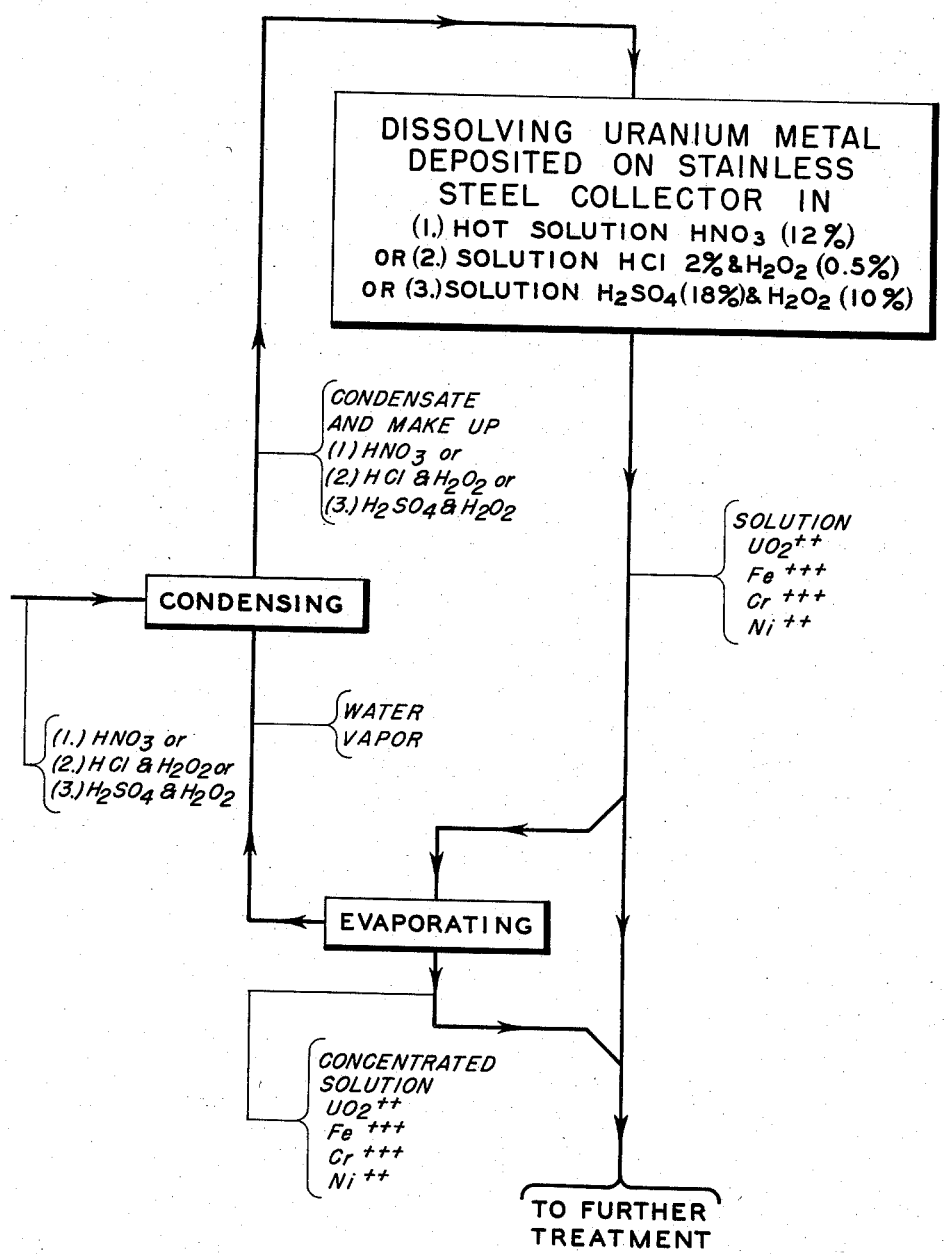
Figure 4:
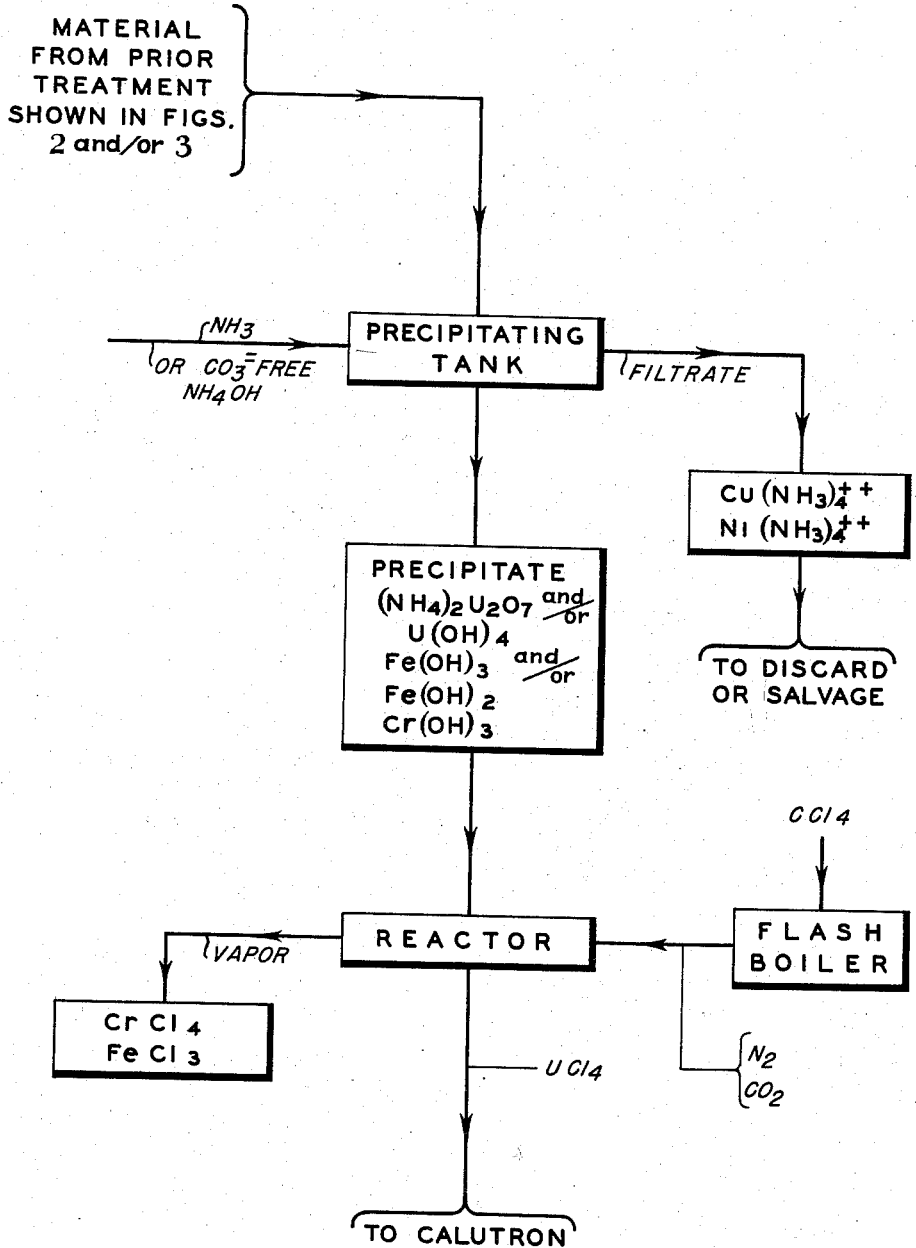

The invention, both as to its organization and method of operation, together with further objects and advantages thereof, will best be understood by reference to the following specification taken in connection with the accompanying drawings in which Figure 1 is a perspective view of a calutron in conjunction with which there may be carried out the process of the invention; Figure 2 illustrates a portion of the flow diagram of the instant process indicating the recovery of the residue of $UCl_4$ from the parts of the calutron disposed in the source region thereof upon which it is deposited; Figure 3 illustrates another portion of the flow diagram of the instant process indicating the recovery of the metallic uranium from the collector of the calutron upon which it is deposited; Figure 4 illustrates a further portion of the flow diagram of the instant process indicating the purification of the uranium contained in the wash solutions together with the conversion thereof to a suitable calutron charging media.

Referring now more particularly to Fig. 1, there is illustrated a representative example of a calutron 10 of the character noted, which comprises magnetic field structure including upper and lower pole pieces 11 and 12, provided with substantially flat parallel spaced-apart pole faces, and a tank 13 disposed between the pole faces of the pole pieces 11 and 12. The pole pieces 11 and 12 carry windings, not shown, which are adapted to be energized in order to produce a substantially uniform and relatively strong magnetic field therebetween, which magnetic field passes through the tank 13 and the various parts housed therein. The tank 13 is of tubular configuration, being substantially crescent-shaped in plan, and comprising substantially flat parallel spaced-apart top and bottom walls 14 and 15, upstanding curved inner and outer walls 16 and 17, and end walls 18 and 19. The end walls 18 and 19 close the opposite ends of the tubular tank 13 and are adapted to be removably secured in place, whereby the tank 13 is hermetically sealed. Also, vacuum pumping apparatus, not shown, is associated with the tank 13, whereby the interior of the tank 13 may be evacuated to a pressure of the order of $10^{-5}$ to $10^{-4}$ mm. Hg. Preferably, the component parts of the tank 13 are formed of steel, the bottom wall 15 thereof resting directly upon the pole face of the lower pole piece 12, and the top wall 14 thereof being spaced a suitable distance from the pole face of the upper pole piece 11, whereby the top and bottom walls 14 and 15 constitute in effect pole pieces with respect to the interior of the tank 13, as explained more fully hereinafter.

The removable end wall 18 carries an insulator 20 which supports an upstanding charge block 21, provided with a hollow central cavity 22 constituting a charge receiving pocket surrounded by rather thick side walls. Electrical heating elements 23 are embedded in the side walls of the charge block 21 and are adapted to be connected to a suitable source of current, whereby the charge block 21 may be appropriately heated, the charge block 21 being formed of cast steel or the like. Also, the charge block 21 is provided with a removable cover, not shown, and supports a tubular member 24 which in turn supports an arc block 25 formed of carbon or graphite. The arc block 25 is substantially C-shaped in plan, an upstanding slot 26 being formed in the wall thereof remote from the charge block 21. Thus, the arc block 25 is of hollow construction, having a central arc cavity 27 formed therein, the arc cavity 27 formed in the arc block 25 communicating through the tubular member 24 with the cavity 22 formed in the charge block 21.

Also, the removable end wall 18 carries an insulator 28, disposed above the insulator 20, which supports horizontally proecting cathode structure 29, including a filamentary cathode 30 adapted to be connected to a suitable source of current. The cathode structure 29 projects over the upper end of the charge block 21, whereby the filamentary cathode 30 overhangs and is aligned with respect to the upper end of the cavity 27 formed in the arc block 25. Further, an anode 31 is arranged below and in alignment with respect to the lower end of the cavity 27 formed in the arc block 25, the anode 31 being supported by the charge block 21. The filamentary cathode 30 and the cooperating anode 31 are adapted to be connected to a suitable source of current.

Ion accelerating structure, including a pair of upstanding plates 32 formed of carbon or graphite, is supported by insulating structure, not shown, carried by the removable end wall 18. The pair of upstanding plates 32 are arranged in spaced-apart relation in order to define a slit 33 therebetween, arranged in substantial alignment with respect to the slot 26 formed in the wall of the arc block 25. A suitable source of voltage is adapted to be connected between the arc block 25 and the ion accelerating structure, including the plates 32, for a purpose more fully explained hereinafter.

The removable end wall 19 carries an insulator 34 which supports an upstanding collector block 35 formed of stainless steel or the like and provided with two laterally spaced-apart cavities or pockets 36 and 37 which communicate with aligned slots 38 and 39 formed in the wall of the collector block 35 disposed remote from the removable end wall 19. Alternatively, the collector block may be fabricated of steel plate and the inner surfaces of the pockets 36 and 37 lined with stainless steel plates. It is noted that the pockets 36 and 37 are adapted to receive two constituent isotopes of an element which have been separated in the calutron 10, as explained more fully hereinafter. Finally, the inner wall 16 carries a number of insulators 40 which support a tubular liner 41 formed of copper or the like, rectangular in vertical cross-section, disposed within the tank 13 and spaced from the walls 14, 15, 16 and 17 thereof. One end of the tubular liner 41 terminates adjacent the accelerating structure, including the plates 32; and the other end of the tubular liner 41 terminates adjacent the collector block 35; the tubular liner 41 constituting an electrostatic shield for the high-velocity ions traversing the curved paths between the slit 33 formed by the plates 32 of the ion accelerating structure and the slots 38 and 39 formed in the collector block 35, as explained more fully hereinafter.

In view of the above description, it will be understood that the parts of the calutron 10 carried by the removable end wall 18 constitute a source unit, and the end of the tank 13 disposed adjacent the source unit constitutes the source region of the calutron. Similarly, the parts of the calutron carried by the removable end wall 19 constitute a collector unit, and the end of the tank 13 disposed adjacent the collector unit constitutes the collector region of the calutron.

Considering now the general principle of operation of the calutron 10, a charge comprising a compound of the element to be treated is placed in the charge pocket 22 in the charge block 21, the compound of the element mentioned being one which may be readily vaporized. The cover, not shown, is then secured on the charge block 21 and the end walls 18 and 19 are securely attached to the open ends of the tank 13, whereby the tank 13 is hermetically sealed. The various electrical connections are completed and operation of the vacuum pumping apparatus, not shown, associated with the tank 13 is initiated. When a pressure of the order of $10^{-5}$ to $10^{-4}$ mm. Hg is established within the tank 13, the electric circuits for the windings associated with the pole pieces 11 and 12 are closed and adjusted, whereby a predetermined magnetic field is established therebetween, traversing the tank 13. The electric circuit for the heating elements 23 is closed, whereby the charge in the charge pocket 22 in the charge block 21 is heated and vaporized. The vapor fills the charge pocket 22 and is conducted through the tubular member 24 into the cavity 27 formed in the arc block 25. The electric circuit for the filamentary cathode 30 is closed, whereby the filamentary cathode 30 is heated and rendered electron-emissive. Then the electric circuit between the filamentary cathode 30 and the anode 31 is closed, whereby an arc discharge is struck therebetween, electrons proceeding from the filamentary cathode 30 to the anode 31. The electrons proceeding from the filamentary cathode 30 to the anode 31 break up the molecular form of the compound of the vapor to a considerable extent, producing positive ions of the element which is to be enriched with a selected one of its isotopes.

The electric circuit between the arc block 25 and the ion accelerating structure, including the plates 32, is completed, the plates 32 being at a high negative potential with respect to the arc block 25, whereby the positive ions are attracted and accelerated to the voltage impressed between the arc block 25 and the ion accelerating structure. More particularly, the positive ions proceed from the interior of the cavity 27 formed in the arc block 25, through the slot 26 formed in the wall thereof, and across the space between the plates 32 and the adjacent wall of the arc block 25, and thence through the slit 33 formed between the plates 32 into the interior of the tubular liner 41. The high-velocity positive ions form a vertical upstanding ribbon proceeding from the cavity 27 formed in the arc block 25 through the slot 26 and the aligned slit 33 into the tubular liner 41.

The collector block 35, as well as the tubular liner 41, is electrically connected to the ion accelerating structure, including the plates 32, whereby there is an electric field-free path for the high velocity positive ions, disposed between the plates 32 and the collector block 35 within the tubular liner 41. The high-velocity positive ions entering the adjacent end of the liner 41 are deflected from their normal straight-line path and form a vertical plane, passing through the slot 26 and the slit 33, due to the effect of the relatively strong magnetic field maintained through the space within the tank 13 and the liner 41 through which the positive ions travel, whereby the positive ions describe arcs, the radii of which are proportional to the square roots of the masses of the ions and consequently of the isotopes of the element mentioned. Thus, relatively light ions, a relatively light isotope of the element, describe an interior arc of relatively short radius and are focused through the slot 38 into the pocket 36 formed in the collector block 35; whereas relatively heavy ions, a relatively heavy isotope of the element, describe an exterior arc of relatively long radius and are focused through the slot 39 into the pocket 37 formed in the collector block 35. Accordingly, the relatively light ions are collected in the pocket 36 and are de-ionized to produce a deposit of the relatively light isotope of the element therein, while the relatively heavy ions are collected in the pocket 37 and are de-ionized to produce a deposit of the relatively heavy isotope of the element therein.

After all of the charge in the charge pocket 22 formed in the charge block 21 has been vaporized, all of the electric circuits are interrupted and the end wall 18 is removed so that another charge may be placed in the pocket 22 and subsequently vaporized in the manner explained above. After a suitable number of charges have been vaporized in order to obtain appropriate deposits of the isotope of the element in the pockets 36 and 37 of the collector block 35, the end wall 19 may be removed and the deposits of the collected isotopes in the pockets 36 and 37 in the collector block 35 may be reclaimed.

Of course, it will be understood that the various dimensions of the parts of the calutron 10, the various electrical potentials applied between the various electrical parts thereof, as well as the strength of the magnetic field between the pole pieces 11 and 12, are suitably correlated with respect to each other, depending upon the mass numbers of the several isotopes of the element which is to be treated therein. In this connection, reference is again made to the copending application of Ernest O. Lawrence for a complete specification of a calutron especially designed for the production of uranium enriched with the isotope $U^{235}$. By way of illustration, it is noted that when the calutron 10 is employed in order to produce uranium enriched with $U^{235}$, the compound of uranium which is suggested as a suitable charge in the charge block 21 is $UCl_4$, as this compound may be readily vaporized and the molecular form of the vapor may be readily broken up to form positive ions of uranium with great facility. In this case, uranium enriched with $U^{235}$ is collected in the pocket 36 of the collector block 35, and uranium comprising principally $U^{238}$ is collected in the pocket 37 of the collector block 35. Also, it is noted that from a practical standpoint, the deposit of uranium collected in the pocket 36 of the collector block 35 contains considerable amounts of $U^{238}$, in view of the fact that this isotope comprises the dominant constituent of ordinary uranium. Furthermore, the deposit of uranium collected in the pocket 36 of the collector block 35 contains a considerably increased amount of $U^{234}$, in view of the fact that it is not ordinarily feasible to separate $U^{234}$ and $U^{235}$ in the production of relatively large quantities of uranium enriched with $U^{235}$ for commercial purposes. Accordingly, in this example the uranium deposited in the pocket 36 of the collector block 35 is considerably enriched, both with $U^{234}$ and $U^{235}$, and considerably impoverished with respect to $U^{238}$ as compared to natural or normal uranium.

During the operation of the calutron 10 in the production of uranium enriched with $U^{235}$, the compound $UCl_4$ is vaporized in the charge block 21 and conducted through the tubular member 24 into the cavity 27 formed in the arc block 25, where it is subjected to ionization as previously explained. Only a minor fraction (about 5%) of the $UCl_4$ vapor is actually ionized in the cavity 27 formed in the arc block 25 and drawn through the slot 26 due to the ion accelerating structure, including the plates 32. The major fraction (about 95%) of the $UCl_4$ vapor is un-ionized in the cavity 27 formed in the arc block 25 and flows through the slot 26 due to the pressure differential between the cavity 27 and the interior of the liner 41. This major fraction of the $UCl_4$ vapor, being un-ionized, is not at all affected by the ion accelerating structure, including the plates 32, and travels into contact with the various parts of the calutron disposed in the source region thereof, upon which parts it is condensed primarily in the compound form $UCl_4$ as a residue. More particularly, this residue is condensed principally upon the interior of the adjacent end of the liner 41, but to some extent upon the exterior thereof, the walls of the tank 13 in the region of the source and upon the exterior surfaces of the various elements of the source unit including the arc block 25, the charge block 21, etc.

More particularly, the minor fraction of the $UCl_4$ vapor is ionized to form positive atomic ions including $U^+$, $U^{++}$, $Cl^+$ and $Cl^{++}$; and positive molecular ions including $Cl_2^+$, $Cl_2^{++}$, $UCl_4^+$, $UCl_4^{++}$, $UCl_3^+$, $UCl_3^{++}$, $UCl_2^+$, $UCl_2^{++}$, $UCl^+$ and $UCl^{++}$. Of these atomic and molecular ions only the singly ionized atomic ions $U^+$ have the required ratio between mass and charge such that they are focused through the slots 38 and 39 into the pockets 36 and 37 formed in the collector block 35; the atomic ions $U^+$ of masses 234 and 235 focusing through the slot 38 into the pocket 36, and the atomic ions $U^+$ of mass 238 focusing through the slot 39 into the pocket 37, as previously noted.

The doubly ionized atomic ions $U^{++}$ have such a ratio between mass and charge that they are deflected along an arc of shorter radius into engagement with the inner wall of the liner 41, where they are de-ionized to form a deposit thereon. The singly and doubly ionized atomic ions $Cl^+$ and $Cl^{++}$ and the singly and doubly ionized molecular ions $Cl_2^+$ and $Cl_2^{++}$ have such small ratios between mass and charge that they are deflected along arcs of very short radii into engagement with the inner wall of the liner 41 adjacent the source region, where they are de-ionized to form neutral chlorine molecules, which gas is subsequently pumped from the tank 13 due the operation of the vacuum pumping apparatus previously noted. Similarly, the doubly ionized molecular ions $UCl_4^{++}$, $UCl_3^{++}$, $UCl_2^{++}$ and $UCl^{++}$ have intermediate ratios between mass and charge such that they are deflected along arcs of intermediate radii into engagement with the inner wall of the liner 41 intermediate the source region and the collector region, where they are de-ionized to form a deposit thereon. Finally, the singly ionized molecular ions $UCl_4^+$, $UCl_3^+$, $UCl_2^+$ and $UCl^+$ have large ratios between mass and charge, such that they are deflected along arcs of large radii into engagement with the outer wall of the liner 41 intermediate the source region and the collector region, where they are de-ionized to form a deposit thereon.

Accordingly, it will be understood that, after operation of the calutron 10 to vaporize a reasonable number of charges of $UCl_4$ in the charge block 21, a considerable deposit of $UCl_4$ is formed on the adjacent end of the liner 41, and that a reasonable deposit of metallic uranium, as well as the various uranium chlorides, is formed on the intermediate portion of the liner 41. These deposits represent uranium which contains the various isotopes $U^{238}$, $U^{235}$ and $U^{234}$ in natural or normal amounts such that these deposits should be recovered for recycling purposes as well as to clean the liner 41 and the other parts of the calutron 10 in order to insure efficient operation thereof.

Considering the present process in greater detail with reference to the production of uranium enriched with $U^{235}$, it is pointed out that natural or normal uranium comprises three isotopes, $U^{238}$, $U^{235}$ and $U^{234}$, in the approximate relative abundances 1, 1/139 and 1/16,700 (in numbers of atoms with reference to $U^{238}$), respectively, or approximately 16,700, 120 and 1 atoms, respectively, in 16,821 atoms of a sample. It is highly desirable to prepare large quantities of uranium enriched with the thermal-neutron fissionable isotope $U^{235}$ for commercial purposes, and it has been found that this end can be accomplished by employing the calutron method. However, it is desirable that the uranium product have an enrichment factor with respect to $U^{235}$ of the order of 400, this factor being defined as the quotient obtained by dividing the ratio of $U^{235}$ to $U^{238}$ in the product with the ratio of $U^{235}$ to $U^{238}$ in the original material. Now assuming that the product is enriched by 400 in both $U^{235}$ and $U^{234}$, it comprises $U^{238}$, $U^{235}$ and $U^{234}$ in the approximate relative abundances 1, 400/139 and 400/16,700 (in numbers of atoms with reference to $U^{238}$), respectively, or approximately 16,700, 48,057 and 400 atoms, respectively, in 65,157 atoms of a sample. Thus the enriched uranium product comprises approximately 25.7% $U^{238}$, 73.7% $U^{235}$ and 0.6% $U^{234}$.

In order to obtain this desired enrichment of the uranium product by utilizing the calutron method, it has been found most convenient to use first-stage and second-stage calutrons, the first-stage calutrons employing natural or normal uranium and producing a first-stage enriched product having an enrichment factor of the order of 20 with respect to natural or normal uranium; and the second-stage calutrons employing first-stage enriched uranium and producing a second-stage enriched product having an enrichment factor of the order of 20 with respect to the first-stage enriched uranium, whereby the second-stage enriched uranium product has a final enrichment factor of the order of 400 with respect to natural or normal uranium. By employing the present process, whereby the ultimate enrichment of the final uranium product is obtained in two stages, as indicated above, each of the first-stage and the second-stage calutrons may be operated in the stable range and to give a maximum yield of enriched material.

Accordingly, in the present process it will be understood that in the event the calutron 10 comprises a first-stage calutron, the deposit of uranium in the pocket 37 in the collector block 35 has been impoverished with respect to the desired isotope $U^{235}$, and is recovered therefrom and discarded; while the deposit of uranium in the pocket 36 in the collector block 35 has been singly enriched with respect to the desired isotope $U^{235}$, and is recovered therefrom and subsequently treated in a second-stage calutron. On the other hand, in the event the calutron 10 comprises a second-stage calutron, the deposit of uranium in the pocket 37 in the collector block 35 has been first enriched and then impoverished with respect to the desired isotope $U^{235}$, and is recovered therefrom and analyzed to determine its $U^{235}$ content for possible recycling in a first-stage calutron; while the deposit of uranium in the pocket 36 in the collector block 35 has been doubly enriched with respect to the desired isotope $U^{235}$, and is recovered therefrom for commercial use.

Thus it will be understood that in a first-stage calutron, the deposit of metallic uranium in the pocket 36 in the collector block 35 has been subjected to one treatment and is termed "singly enriched" uranium, the enrichment being with respect to the desired isotope, $U^{235}$; on the other hand, in a second-stage calutron the deposit of metallic uranium in the pocket 36 in the collector block 35 has been subjected to two treatments, and is termed "doubly enriched" uranium, the enrichment being with respect to the desired isotope, $U^{235}$.

Considering now the present process in greater detail, it will be understood that a plant arranged to carry out the process will comprise a relatively large number of first-stage calutrons and a relatively small number of second-stage calutrons, in addition to facilities for handling, storing, recovering, purifying and converting the various metallic and compound forms of uranium. The starting material employed as a charge in the first-stage calutron is $UCl_4$, comprising natural or normal uranium, whereby metallic uranium singly enriched with $U^{235}$ is deposited in the first pocket of the collector and metallic uranium impoverished with respect to $U^{235}$ is deposited in the second pocket of the collector. Also, a large amount of $UCl_4$ is deposited as a residue upon the parts of the first-stage calutron disposed in the source region thereof, the deposit being primarily on the source-region end of the liner. After several charges of $UCl_4$, comprising natural or normal uranium, have been employed in the first-stage calutron, reasonable deposits of metallic uranium have been collected in the first and second pockets of the collector, and the metallic uranium deposits in the collector and the $UCl_4$ residue on the liner are recovered.

More particularly, the metallic uranium singly enriched with $U^{235}$ and deposited in the first pocket of the collector is recovered by an acid wash process, whereby various impurities including iron, chromium and nickel are introduced in the wash solution, due to the fact that the collector of the first-stage calutron which is thus washed with acid is formed of the metals mentioned. Accordingly, the wash solution containing the uranium singly enriched with $U^{235}$ which has been reclaimed contains considerable impurities. This wash solution is stored and subsequently employed as makeup materal in a purification process utilized in conjunction with the second-stage calutron, in a manner more fully explained hereinafter. The metallic uranium impoverished with respect to $U^{235}$ and deposited in the second pocket of the collector is recovered by an acid wash process and discarded, as it contains so little $U^{235}$ that further processing thereof is not feasible.

The residue of $UCl_4$ deposited on the parts of the first-stage calutron disposed in the source region thereof, principally upon the liner, is recovered by a water wash process, whereby various impurities including copper, iron, chromium, nickel and carbon are introduced in the wash solution, due to the fact that the various parts of the first-stage calutron which are thus washed with water are formed of the materials mentioned. Accordingly, the wash solution containing natural or normal uranium which has been reclaimed, contains considerable impurities. To this wash solution there is added makeup material in the form of a wash solution derived from the second-stage calutron, and comprising the wash solution from the second pocket of the collector, and containing uranium which has been first enriched with $U^{235}$ in the first-stage calutron and subsequently impoverished with respect to $U^{235}$ in the second-stage calutron, as explained more fully hereinafter. This composite wash solution is then subjected to a combination treatment to purify said wash solution and reconvert the uranium to $UCl_4$. The $UCl_4$ so produced is then employed along with a suitable amount of makeup $UCl_4$ as a charge in the first-stage calutron.

Accordingly, the $UCl_4$ deposited in the source region of the first-stage calutron is treated to render it recyclable therein; the first-stage, enriched uranium is then stored for use in the second-stage calutron and the first-stage, impoverished uranium is discarded.

The starting material employed as a charge in the second-stage calutron is $UCl_4$ prepared and purified as hereinafter described, comprising singly enriched uranium whereby metallic uranium doubly enriched with $U^{235}$ is deposited in the first pocket of the collector and metallic uranium which has been first enriched in the first-stage calutron and then impoverished in the second-stage calutron is deposited in the second pocket of the collector. Also, a large amount of $UCl_4$ is deposited as a residue upon the parts of the second-stage calutron disposed in the source region thereof, the deposit being primarily on the source region end of the liner. After several charges of $UCl_4$ comprising singly enriched uranium have been employed in the second-stage calutron, reasonable deposits of metallic uranium have been collected in the first and second pockets of the collector and the metallic uranium deposits in the collector and the $UCl_4$ residue on the liner are recovered.

More particularly, the metallic uranium doubly enriched with $U^{235}$ and deposited in the first pocket of the collector is recovered by an acid wash process, whereby various impurities including iron, chromium and nickel are introduced in the wash solution, due to the fact that the collector of the second-stage calutron which is thus washed with acid is formed of the metals mentioned. Accordingly, the wash solution containing the uranium doubly enriched with $U^{235}$, which has been reclaimed, contains considerable impurities. This wash solution is then purified in order to eliminate the impurities mentioned; the impurities thus eliminated are discarded or salvaged; and the uranium thus purified is converted into a standard compound of uranium for commercial use. The metallic uranium first enriched with $U^{235}$ and subsequently impoverished with respect to $U^{235}$ and deposited in the second pocket of the collector is recovered by an acid wash process, whereby various impurities including iron, chromium and nickel are introduced in the wash solution, due to the fact that the collector of the second-stage calutron which is thus washed with acid is formed of the metals mentioned. Accordingly, the wash solution containing the uranium first enriched with $U^{235}$ and subsequently impoverished with respect to $U^{235}$ which has been reclaimed contains considerable impurities. The uranium in the wash solution is then analyzed, and in the event it contains at least as much $U^{235}$ as natural or normal uranium, it is employed as makeup material in the purification process utilized in conjunction with the first-stage calutron.

The residue of $UCl_4$ deposited on the parts of the second-stage calutron disposed in the source region thereof, principally upon the liner, is recovered by a water wash process, whereby various impurities including copper, iron, chromium, nickel and carbon are introduced in the wash solution due to the fact that the various parts of the second-stage calutron which are thus washed with water are formed of the materials mentioned. Accordingly, the wash solution containing the singly enriched uranium which has been reclaimed contains considerable impurities. To this wash solution there is added the previously stored makeup material in the form of the wash solution derived from the first-stage calutron and comprising the acid wash solution from the first pocket of the collector of the first-stage calutron and containing singly enriched uranium.

This composite wash solution is then treated as will be hereinafter described to eliminate the impurities mentioned and convert the uranium back to the compound $UCl_4$. This compound of $UCl_4$ is then employed as a charge in the second-stage calutron.

Accordingly, the residue of $UCl_4$ deposited in the source region of the second-stage calutron is treated to render it recyclable therein; the second-stage enriched uranium is converted to a standard compound of uranium to be used commercially; and the second-stage impoverished uranium is stored for use in the first-stage calutron.

Considering now the details of the recovery of the $UCl_4$ residue from the parts of either a first-stage or second-stage calutron deposited in the source region thereof, reference is made to the portion of flow diagram illustrated in Figure 2, the parts of the calutron disposed in the source region thereof, principally the source region end of the liner, are scrubbed and washed with hot water whereby the residue of $UCl_4$ deposited thereon is dissolved; and various impurities including copper, iron, chromium, nickel, and carbon are introduced into the wash water due to the fact that the various parts of the calutron which are thus washed with hot water are formed of the materials mentioned. The wash water is then sieved in order to remove any solvent impurities which may be picked up such, for example, as small pieces of metal and carbon. These solvent impurities may be either discarded or subjected to salvage treatment in order to recover any occluded uranium. As shown in Fig. 2, the sieved wash water may then be passed directly to the evaporation stage, or if desired it may first be treated with $H_2O_2$ by adding a slight excess of 10% $H_2O_2$ and agitating this solution in order to oxidize the various contained materials.

For example, the wash water prior to the step of oxidation may contain suspended $U(OH)_4$ and bits of copper and carbon; dissolved uranium in the $+4$ and $+6$ valence states, as well as dissolved copper, iron, nickel, chromium, and possibly other metals in one or more of the positive valence states. Hence, as a result of oxidation all of the uranium is put in solution as uranyl ion, suspended copper is put in solution as cupric ion, and other dissolved materials are put in their higher stable valence states if they are not already in such state. Carbon is not oxidized by this treatment. The effect of the oxidation on the various materials contained in the wash solution may be indicated as follows:

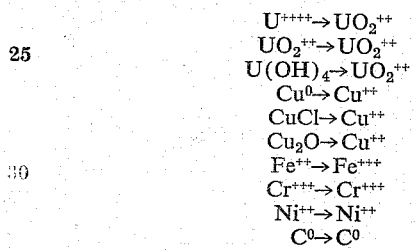

Accordingly, the oxidized wash water contains at least the following: $UO_2^{++}$, $Cu^{++}$, $Fe^{+++}$, $Cr^{+++}$, $Ni^{++}$ and $C^0$ (carbon). The oxidized wash water is then filtered in order to remove $C^0$, which may be discarded or subjected to salvage treatment in order to recover any occluded uranium.

In the event this filtrate is rather dilute, it may be concentrated by evaporation; otherwise this step is omitted. In the event the filtrate is concentrated by evaporation, the water vapor which is driven off is condensed and to it is added enough makeup water in order to provide a new wash solution, which is used again to wash the parts of the calutron disposed in the source region thereof, in the manner previously explained. This step, comprising condensing and re-using the water vapor which is driven off the filtrate incident to concentration by evaporation, is advantageous in view of the fact that any uranium entrained in the water vapor is not lost to the outside. The original filtrate mentioned above, or the concentrated filtrate following evaporation, in the event this step is employed, is then stored for further treatment.

It will be understood that the stored water wash derived from the parts of the first-stage calutron disposed in the source region thereof, as explained above, comprises uranium of natural or normal composition with reference to $U^{235}$; while the stored water wash derived from the parts of the second-stage calutron disposed in the source region thereof, as explained above, comprises uranium which is singly enriched with $U^{235}$.

Considering now the details of the recovery of the metallic uranium, singly enriched with $U^{235}$, from the first pocket of the collector of the first-stage calutron, or of the metallic uranium, doubly enriched with $U^{235}$, from the first pocket of the collector of the second-stage calutron, reference is made to the portion of the flow diagram illustrated in Fig. 3. The inner surfaces of the first pocket of the collector of the calutron are etched with one of a number of acid solutions, whereby the deposit of metallic uranium, either singly or doubly enriched with $U^{235}$, is dissolved; and various impurities including iron, chromium and nickel are introduced in the acid wash solution, due to the fact that the inner surfaces of the first pocket of the collector of the calutron which are thus etched with the acid solution are formed of stainless steel which comprises the materials mentioned. Accordingly, the wash acid contains at least the following ions: $UO_2^{++}$, $Fe^{+++}$, $Cr^{+++}$, and $Ni^{++}$.

A suitable acid wash solution which may be employed for the purpose mentioned comprises an aqueous solution containing $HNO_3$ (approximately 12%). Another suitable acid wash solution comprises an aqueous solution containing HCl (approximately 2%) and $H_2O_2$ (approximately 0.5%). A further suitable acid wash solution comprises an aqueous solution containing $H_2SO_4$ (approximately 18%) and $H_2O_2$ (approximately 10%). Thus, it will be understood that the first acid wash solution comprises an oxidizing acid, whereas the second and third acid wash solutions comprise a separate oxidizing agent in the form of $H_2O_2$. Hence, the acid wash solution employed in any case produces an oxidizing effect upon both the uranium and the metal impurities which are dissolved therein.

In the event the wash acid is rather dilute in the ions mentioned, it may be concentrated by evaporation; otherwise this step is omitted. In the event the wash acid is concentrated by evaporation, the vapor which is driven off is condensed and to it is added enough makeup $HNO_3$, or HCl and $H_2O_2$, or $H_2SO_4$ and $H_2O_2$, depending upon the composition of the original wash acid employed, in order to provide a new wash acid which is again used to wash the first pocket of the collector of the calutron, in the manner previously explained. This step, comprising condensing the vapor which is driven off the wash acid incident to concentration by evaporation, is advantageous in view of the fact that any uranium entrained in the vapor is not lost to the outside. The original wash acid mentioned above, or the concentrated wash acid following evaporation, in the event this step is employed, is then stored for further treatment.

It will be understood that the stored acid wash derived from the first pocket of the collector of the first-stage calutron, as explained above, comprises uranium which is singly enriched with $U^{235}$; while the stored acid wash derived from the first pocket of the collector of the second-stage calutron, as explained above, comprises uranium which is doubly enriched with $U^{235}$.

The metallic uranium, impoverished with respect to $U^{235}$ and deposited in the second pocket of the collector of the first-stage calutron, may be recovered merely by etching the inner surfaces of the second pocket of this collector with a suitable wash acid of the character mentioned above, whereby this deposit of metallic uranium is dissolved. This acid wash is then discarded, as it contains so little $U^{235}$ that further processing thereof is not feasible.

On the other hand, the metallic uranium which has been first enriched with respect to $U^{235}$ and subsequently improverished with respect to $U^{235}$, and deposited in the second pocket of the collector of the second-stage calutron, may be recovered by etching the inner surfaces of the second pocket of this collector with a suitable wash acid of the character mentioned above, whereby this deposit of metallic uranium is dissolved; and various impurities, including iron, chromium and nickel are introduced in the acid wash solution, due to the fact that the inner surfaces of the second pocket of the collector of the calutron which are thus etched with the acid solution are formed of stainless steel which comprises the materials mentioned. Accordingly, the wash acid contains at least the following ions: $UO^{++}$, $Fe^{+++}$, $Cr^{+++}$ and $Ni^{++}$. The considerations concerning whether the wash acid should be concentrated are the same as those previously noted. In any case, either the original wash acid mentioned above, or the concentrated wash acid following evaporation, in the event this step is employed, is then analyzed in order to determine the $U^{235}$ content thereof. In the event the analysis indicates that the $U^{235}$ content of this wash acid is at least as great as natural or normal uranium, it is stored for further treatment; on the other hand, in the event the analysis indicates that the $U^{235}$ content of this wash acid is less than that of natural or normal uranium, it is discarded, as further processing thereof is not feasible.

To the stored water wash solution derived from the parts of the first-stage calutron disposed in the source region thereof, there is added the stored acid wash solution derived from the second pocket of the collector of the second-stage calutron in order to produce a first composite solution; this first composite solution comprises uranium of substantially natural or normal composition with reference to $U^{235}$. Also, to the stored water wash solution derived from the parts of the second-stage calutron disposed in the source region thereof, there is added the stored acid wash solution derived from the first pocket of the collector of the first-stage calutron in order to produce a second composite solution; this second composite solution comprises uranium which is singly enriched with $U^{235}$. Finally, the stored acid wash solution derived from the first pocket of the collector of the second-stage calutron constitutes a third composite solution; this third composite solution comprises uranium which is doubly enriched with $U^{235}$.

Considering now the details of the purification steps of the instant process in which uranium is treated in a calutron and composite solutions are produced as has been described in the foregoing, reference is made to the portion of the flow diagram illustrated in Figure 4.

The solutions referred to which have been discussed in connection with Figures 2 and 3 comprise the following ions: $UO_2^{++}$, $Fe^{+++}$, $Cr^{+++}$, $Cu^{++}$, and $Ni^{++}$. In accordance with the instant process, a solution comprising said ions is subjected to treatment with excess $NH_3$ gas or carbonate-free $NH_4OH$ whereby $(NH_4)_2U_2O_7$, $Fe(OH)_3$, and $Cr(OH)_3$ are precipitated away from most of the copper and nickel in solution in the form of ammonia complex ions, $Cu(NH_3)_4^{++}$ and $Ni(NH_3)_4^{++}$. The solution is then filtered and the precipitate consisting of ammonium diuranate, ferric hydroxide, and chromic hydroxide is preferably washed with water containing about 1% $(NH_4)OH$ and 1% $(NH_4)NO_3$.

The precipitate comprising ammonium diuranate, ferric hydroxide, and chromic hydroxide is then placed in a chlorinating reactor which may be a closed vessel of suitable material, such as glass or other non-corrosive material. A suitable heating element is provided for the reactor, and during the chlorinating reaction the metallic precipitate is maintained at a temperature in the range of approximately 380° to 480° C. and preferably about 450° C. The metallic precipitate is maintained at said chlorinating temperature while carbon tetrachloride vapor is passed over said precipitate until substantially complete chlorination thereof is accomplished. Under such conditions the chromium and iron are converted to chlorides which are volatile at the reaction temperature mentioned and which, accordingly, will pass out of the reactor through a suitable opening. The chromium so chlorinated and volatilized is in the form of $CrCl_4$ and the iron as $FeCl_3$. The uranium will be left in the reactor as the tetrachloride in which form it is suitable for and is utilized as calutron charging material. It should be noted that certain modifications may be made in the procedure, as has been described in the foregoing; for example, the carbon tetrachloride may be carried by an inert gas such as nitrogen or carbon dioxide. Then, too, whereas I prefer to carry out the reaction at substantially atmospheric pressure, lower and higher pressures may be resorted to as desired. It may be found convenient and desirable to reduce the precipitate to a granular or pulverized form prior to contacting said precipitate with the chlorinating agent.

It will be understood that the purification of the first composite solution in the manner desscribed above is productive of a first batch of $UCl_4$ containing uranium of natural or normal composition with reference to $U^{235}$. Also, the purification of the second composite solution in the manner described above is productive of a second batch of $UCl_4$ containing uranium which is singly enriched with $U^{235}$. Finally, the purification of the third composite solution in the manner described above is productive of the third batch of $UCl_4$ containing uranium which is doubly enriched with $U^{235}$. The first and second batches of $UCl_4$ are utilized as charging stock for first-stage and second-stage calutrons, respectively; while the third batch of $UCl_4$ is available for commercial use.

In view of the foregoing, it is apparent that there has been provided an improved process of recovering, reclaiming, purifying, and converting uranium, both in metallic and compound form, in conjunction with the calutron method, whereby uranium enriched with $U^{235}$ may be produced on a large scale in commercial quantities.

The term "uranium" is employed in the present specification and claims in a generic sense, i. e., as applying to uranium whether present in elemental, ionic, or compound form, unless indicated otherwise by the context. Furthermore, the terms "ammonia" and "ammonium hydroxide" are used interchangeably, so that the use of either term is to be construed as covering the use of both substances, unless the contrary is indicated by the context.

While there has been described what is at present considered to be the preferred embodiment of the invention, it will be understood that various modifications may be made therein and it is intended to cover in the appended claims all such modifications as fall within the true spirit and scope of the invention.

What is claimed is:

1. In a process for reclaiming uranium values from solutions thereof which contain impurities including dissolved iron and copper, the steps comprising treating said solution with ammonia to precipitate the uranium and iron from the solution in which the copper remains dissolved as ammonia complex ions, separating said precipitate from the solution, and chlorinating said precipitate with carbon tetrachloride at a temperature in the range of approximately 380° to 480° C. to convert the uranium into uranium tetrachloride and the iron into $FeCl_3$ which is volatilized away from said uranium tetrachloride without substantial simultaneous volatilization of said uranium tetrachloride.

2. The process of reclaiming uranium values from deposits formed upon the parts of a calutron as a result of the processing of uranium tetrachloride therein comprising washing said parts with an aqueous solvent for the uranium to form a solution containing said uranium values and impurities including dissolved iron, chromium, nickel and copper, treating said solution with ammonia to precipitate the uranium, iron and chromium and leave said copper and nickel in solution as ammonia complex ions, and chlorinating said precipitate with carbon tetrachloride at an elevated temperature to convert said uranium into uranium tetrachloride and to volatilize and separate the iron and chromium as chlorides from said uranium tetrachloride.

3. The process of reclaiming uranium values from deposits formed on the parts of a calutron as a result of the processing of uranium tetrachloride therein, comprising washing said parts with an aqueous solvent for the uranium to form a solution containing said uranium values and impurities including dissolved iron, chromium, nickel and copper, treating said solution with ammonia to precipitate the uranium, iron and chromium away from the nickel and copper which remain as ammonia complexes in said solution, and chlorinating said precipitate with carbon tetrachloride at a temperature in the range of approximately 380° to 480° C. to convert the uranium into uranium tetrachloride and to volatilize and separate the iron and chromium as chlorides from said uranium tetrachlorides.

4. The process of reclaiming uranium values from deposits formed on the parts of a calutron as a result of the processing of uranium tetrachloride therein comprising washing said parts with an aqueous solvent for the uranium to form a solution containing said uranium values and impurities including dissolved iron, chromium, nickel and copper, treating said solution with ammonia to precipitate the uranium, iron and chromium with the nickel and copper remaining in the solution as ammonia complexes, and chlorinating said precipitate by contact with carbon tetrachloride vapor in the presence of an inert gas at an elevated temperature to convert said uranium into uranium tetrachloride and to volatilize and separate the iron and chromium as chlorides from said uranium tetrachloride.

5. The process as in claim 4, wherein said inert gas is nitrogen.

6. The process as in claim 4, wherein said inert gas is carbon dioxide.

7. The process of recovering uranium values from the residue of a water soluble uranium compound deposited upon the parts of a calutron disposed in the source region thereof comprising washing said parts with water to form a wash solution containing said uranium values, whereby metal impurities are introduced into said solution, treating said wash solution with ammonia to precipitate said uranium values in association with iron and chromium, separating said precipitate from said solution, and contacting said separated precipitate with carbon tetrachloride vapor in the presence of an inert gas under such conditions that said uranium values are converted into uranium tetrachloride and said iron and chromium are converted into $FeCl_3$ and $CrCl_4$ respectively and are volatilized as such from said uranium tetrachloride.

8. The process of reclaiming uranium values from the residual deposits formed on the parts of a calutron disposed in the source region thereof as a result of the processing of uranium tetrachloride therein comprising washing said parts with water to form a solution containing said uranium values and impurities including the ions of iron, chromium, copper and nickel, treating said solution with ammonia to precipitate said uranium values together with the iron and chromium and with the copper and nickel remaining in solution as ammonia complex ions, separating said precipitate from said solution, and chlorinating said precipitate with carbon tetrachloride at a temperature in the range of approximately 380° to 480° C. to convert the uranium values contained therein into uranium tetrachloride and to volatilize and separate said iron and chromium as chlorides from said uranium tetrachloride.

9. The process as in claim 8, wherein said chlorination is conducted in the presence of an inert gas and said chlorinating temperature is maintained at 450° C.

10. The process as in claim 2, wherein said values comprise uranium isotope 238 values.

References Cited in the file of this patent

UNITED STATES PATENTS

| 1,070,313 | Adams | Aug. 12, 1913 |
| 1,434,486 | D'Adrian | Nov. 7, 1922 |
| 2,790,701 | Kamen | Apr. 30, 1957 |

OTHER REFERENCES

Friend: Textbook of Inorganic Chemistry, vol. 7, part 3, p. 294 (1926), publ. by Charles Griffin & Co., Ltd., London.